May 3, 1955     A. M. KOZIBA     2,707,286
GUIDE FOR FLUSH VALVES
Filed Oct. 1, 1953
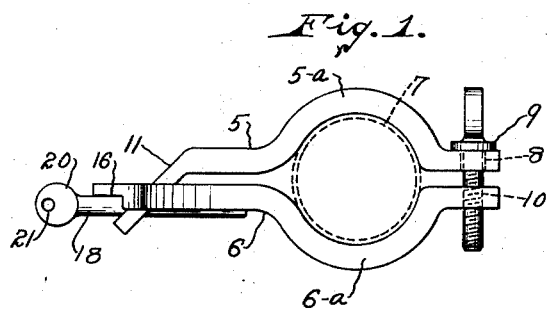
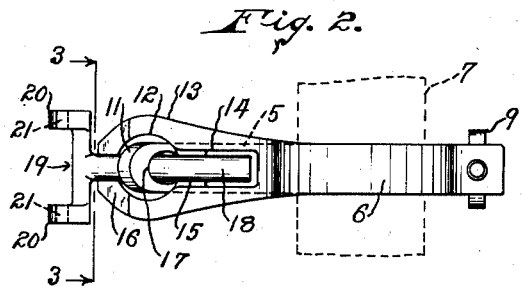
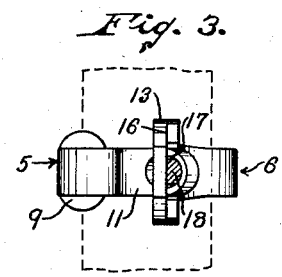
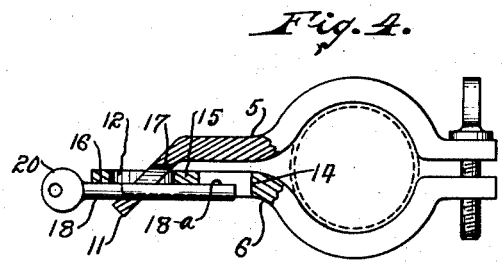
INVENTOR.
ARTOM M. KOZIBA
BY
*Louis V. Lucia*
ATTORNEY

United States Patent Office 2,707,286
Patented May 3, 1955

2,707,286

GUIDE FOR FLUSH VALVES

Artom M. Koziba, East Hartford, Conn.

Application October 1, 1953, Serial No. 383,576

1 Claim. (Cl. 4—57)

This invention relates to a guide for flush valves and more particularly to a device for guiding the rubber ball valve commonly present in toilet flush tanks.

An object of this invention is to provide such a guide having a member adapted to receive the wire stem of the ball valve and which is adjustable to permit accurate positioning of the valve relatively to the outlet opening in the flush tank.

A further object of this invention is to provide a guide in which the adjustable member is secured in adjusted position as the guide is clamped to the overflow pipe in said flush tank.

Further objects and advantages of this invention will be more clearly understood from the following description and the accompanying drawings in which:

Fig. 1 is a plan view of the guide embodying my invention illustrating the manner in which it is secured to the overflow pipe shown in dotted lines.

Fig. 2 is a side view thereof.

Fig. 3 is an end view of the guide taken on line 4—4 of Fig. 2.

Fig. 4 is a plan view thereof, with parts in central horizontal section, further illustrating the construction of my novel guide.

As is commonly known, it is of extreme importance to maintain the rubber ball of toilet flush valves axially of the valve seat around the outlet opening in order to assure proper seating of the ball upon said seat to prevent the leakage of water therearound.

The guide embodying my invention is particularly adapted to facilitate the adjustment of the ball valve relatively to its seat and, upon reference to the accompanying drawings, it will be seen that said guide comprises a pair of arms 5 and 6 having arcuate portions 5–a and 6–a, respectively, that are adapted to receive the overflow pipe 7, indicated in dotted lines, therebetween. The arm 5 is provided at its inner end with an opening 8 for the reception of a clamping screw 9 which is threaded into a threaded opening 10 in the arm 6. The outer end 11 of said arm 5 extends angularly therefrom and is adapted to project through a hole 12 in an enlarged portion 13 at the adjacent end of the arm 6. The outer surface of said enlarged portion of the arm 6 contains a notch 14 which extends longitudinally of the arm rearwardly from the edge of the hole 12 and has a bar 15 extending thereacross. The outer surface of the bar 15 is disposed intermediate the inner and outer sides of the arm 6 and provides an abutment for a purpose to be hereinafter described. The outer end of the arm 6 is cut away to provide an abutment surface 16 thereon which is disposed at the opposite side of the hole and in alignment with the outer surface of the bar 15.

The end 11 of the bar 5 is provided with a hole 17 therethrough which is disposed on a horizontal axis extending parallel to the arm 6. Said hole receives the shank 18 of a T-shaped guide member 19 having vertically spaced bosses 20—20 thereon that are provided with aligned holes 21—21 to receive the conventional wire stem extending from the rubber ball valve. The shank 18 of said guide member is semi-circular in cross-section and is disposed in the notch 14 with its flat side 18–a against the abutment surface 16 and the surface of the bar 15; said shank being of a sufficient length to extend beyond said bar to substantially the end of the notch 14 when in its innermost position relatively to the arms. The curved side of said bar engages the adjacent side of the hole 17 which provides an abutment surface facing the abutment surfaces on the arm 6.

It will be clearly understood that my novel guide is secured to the overflow pipe in the flush tank by loosening the screw 9 to permit the arcuate portions of the arms 5 and 6 to pass over said pipe. It will be noted that the guide member 19 is prevented from tipping relatively to the arms when they are in loosened conditions by the engagement of its shank 18 with the side of the notch 14. The wire stem of the ball valve is then inserted through the openings 21—21 in the member 19 and the arms are positioned around the overflow pipe. The shank of the guide member 19 may then be moved inwardly or outwardly relatively to the axis of the pipe to position the rubber ball valve directly over the outlet opening. The screw 9 is then tightened thereby urging the arms 5 and 6 in opposite directions and around the pipe 7 which causes the portion 11 of the arm 5 and the outer end of the arm 6 to move in opposite directions and thereby securely clamp the shank 18 of the guide 19 between the side of the opening 17 and the abutment surfaces 16 on the end of said arm and on the face of the bar 15.

I claim:

A flush valve guide comprising a pair of arms adapted to receive the overflow pipe in a flush tank therebetween, one of said arms having a longitudinally disposed guide groove in its outer surface and an aperture through the outer end thereof, the axis of said aperture intersecting the longitudinal axis of said groove, said other arm having its outer end bent toward said first arm and sized to freely pass through the aperture in said first arm, said other arm further having an aperture extending transversely of said bent outer end, and a flush valve stem guide member having a shank positioned in the guide groove of said first arm and through the aperture in said other arm, said shank having a flat face abutting the bottom of said guide groove and a rounded surface opposite said flat face, said rounded surface providing an efficient clamping surface for engagement by the wall of the aperture in said bent outer end when said pair of arms are clamped about an overflow pipe.

References Cited in the file of this patent

UNITED STATES PATENTS

| | | |
|---|---|---|
| 2,071,823 | Duncan | Feb. 23, 1937 |
| 2,502,065 | Shobe | Mar. 28, 1950 |
| 2,549,700 | Minton | Apr. 17, 1951 |